(12) United States Patent
Tullis et al.

(10) Patent No.: US 6,472,887 B1
(45) Date of Patent: Oct. 29, 2002

(54) CAPACITIVE SENSOR FOR SENSING THE AMOUNT OF MATERIAL IN A CONTAINER

(75) Inventors: Barclay J. Tullis, Palo Alto; Carl Picciotto, Menlo Park; Jun Gao, Mountain View, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 104 days.

(21) Appl. No.: 09/606,417

(22) Filed: Jun. 28, 2000

(51) Int. Cl.[7] .......................... G01R 27/26; G01F 23/00
(52) U.S. Cl. ....................... 324/663; 324/662; 324/671; 73/304 C
(58) Field of Search ................... 324/674, 662, 324/688, 611, 667, 607, 99 R, 671, 663, 681; 73/304 G; 399/59, 61, 66, 67

(56) References Cited

U.S. PATENT DOCUMENTS

| | | |
|---|---|---|
| 3,301,056 A | 1/1967 | Blanchard et al. ......... 73/304 C |
| 3,533,286 A | 10/1970 | Westcott et al. .......... 73/304 C |
| 3,706,980 A | 12/1972 | Maltby et al. ............... 340/507 |
| 4,133,453 A | 1/1979 | Ohbora et al. ................. 222/39 |
| 5,028,876 A | * 7/1991 | Cadwell ....................... 324/678 |
| 5,465,619 A | 11/1995 | Sotack et al. ............. 73/304 C |
| 5,987,269 A | 11/1999 | Allen et al. .................... 399/27 |

FOREIGN PATENT DOCUMENTS

EP 0936508 A2 8/1999 .................. 399/27

OTHER PUBLICATIONS

Lester Cornelius, "The BX Toner Low Signal", Recharger Magazine, Mar. 1996, pp. 50 and 104–105.
Ira Seaver, "Understanding and Reading Toner Level Signals" Recharger Magazine, Aug. 1996, p. 24 and p. 118–121.
Don Thompson, "Adjusting Away 'Toner Low' on BX Machines", Recharger Magazine, Jun., 1997, p. 53–54.
Walter G. Jung, "IC Timer Cookbook", 1977 and 1983, Howard W. Sams, Inc., pp. 114–121.

* cited by examiner

Primary Examiner—Michael Sherry
Assistant Examiner—Paresh Patel

(57) ABSTRACT

One embodiment of the invention is a capacitive sensor for sensing the amount of material in a container. This embodiment includes an oscillator that generates an oscillating signal. This oscillator includes an integrating amplifier that is formed by (1) an operational amplifier that has a low-impedance output and a virtually-grounded input, and (2) a capacitor that has a capacitance which depends on the amount of material in the container. The capacitor connects between the low impedance output and the virtually-grounded input of the operational amplifier In some embodiments, the operational amplifier includes a first amplifier and a second amplifier that are connected in series, with an output of the second amplifier fed back through the capacitor to the input of the first amplifier.

5 Claims, 8 Drawing Sheets

US 6,472,887 B1

CAPACITIVE SENSOR FOR SENSING THE AMOUNT OF MATERIAL IN A CONTAINER

The present invention is directed towards a capacitive sensor for sensing the amount of material in a container.

BACKGROUND OF THE INVENTION

To date, a variety of sensors have been proposed for detecting the amount of toner in the toner cartridges of reprographic devices, such as printers and copiers. One type of such a sensor is a "capacitive sensor." A capacitive sensor (1) treats the toner material as part of a "toner-capacitor," and (2) detects changes in the toner level by sensing changes in the toner capacitance.

In such sensors, a toner-capacitor is typically formed by placing two conductive electrodes near the toner material. The two electrodes act as the two plates of the toner-capacitor. The toner material serves as one portion of the dielectric material of this capacitor while air serves as another portion of this dielectric material. Hence, the capacitance of the toner-capacitor depends on the toner level, and this capacitance decreases as the toner level decreases and is replaced with air.

FIG. 1 presents a prior art capacitive sensor 100 that treats the toner material as part of a toner-capacitor. The capacitive sensor 100 is similar to a sensor disclosed in U.S. Pat. No. 4,133,453. This sensor generates an oscillating signal, which has a frequency that varies with the capacitance of the toner-capacitor. This sensor uses the frequency of the generated oscillating signal to gauge the toner capacitance and thereby the toner level.

As shown in FIG. 1, the capacitive sensor 100 includes (1) a constant voltage source 125, (2) an oscillator 130, (3) a frequency-to-voltage converter 135, and (4) a comparator 140. The oscillator 130 includes a toner capacitor that connects to the voltage source 125. The oscillator generates an oscillating signal, whose frequency is dependent on the toner capacitance.

The frequency-to-voltage converter 135 receives the oscillating output signal, and generates an output voltage from the frequency of this signal. The 140 compares this output voltage with a reference voltage $V_{REF}$. Based on this comparison, the sensor 100 determines whether the capacitance of the toner-capacitor has decreased below a referenced level. Such a decrease would indicate that the toner level has decreased below a threshold level.

FIG. 2 presents a more detailed view of the oscillator 130. As shown in this figure, the oscillator 130 includes (1) a toner-capacitor 105, (2) resistors 230 and 235, and (3) a 555-timer 200. The toner-capacitor 105 is formed by placing two electrodes 110 and 115 in a toner container. This capacitor's second electrode 10 connects to ground, while its first electrode 115 connects to the constant voltage source 125 through resistors R1 (230) and $R_T$ (235).

The toner-capacitor's first electrode 115 also connects to an input 245 of the 555-timer 200 to provide an input voltage. This timer includes a lower comparator 205, an upper comparator 210, a flip-flop 215, a discharge transistor 220, and an inverting output driver 225. The lower comparator 205 compares the input voltage (from the first electrode 115) with $\frac{1}{3}V_{CC}$, while the upper comparator 210 compares the input voltage with $\frac{2}{3}V_{cc}$.

When the input voltage reaches $\frac{2}{3}V_{CC}$, the upper comparator sets the flip-flop 215 to output a high value. In turn, this high value (1) turns on the discharge transistor 220, and (2) causes the inverting output driver 225 to output a low value. When the input voltage reaches $\frac{1}{3}V_{CC}$, the lower comparator resets the flip-flop 215 to output a low value. This low value (1) cuts off the discharge transistor 220, and (2) causes the inverting output driver 225 to output a high value.

The operation of the oscillator 130 is as follows. Initially, the discharge transistor 220 of the timer 200 is off. This allows the first electrode 115 of toner-capacitor 105 to charge towards $V_{CC}$ through resistors 230 and 235. When the voltage on the first electrode 115 reaches $\frac{2}{3}V_{CC}$, the upper comparator 210 sets the flip-flop 215 to output a high value. This high value turns on the discharge transistor 220 and causes the inverting output driver 225 to output a low value. The discharge transistor 220, in turn, discharges the toner-capacitor 105 until the voltage on the first electrode 115 reaches $\frac{1}{3}V_{CC}$. At this time, the lower comparator 205 resets the flip-flop 215 to output a low value. This low value turns off the discharge transistor 220 and causes the inverting output driver 225 to output a high value. This oscillating process continues indefinitely, and results in an oscillating signal at the oscillator output 240.

The frequency of the oscillating output signal depends on how quickly the toner-capacitor charges to $\frac{2}{3}V_{CC}$ and discharges to $\frac{1}{3}V_{cc}$. Equation (1) below represents the frequency of the oscillating signal when the resistance, R1, of resistor 230 is much smaller than the resistance, $R_T$, of resistor 235 (e.g., resistance R1 is 4.7 kΩ while resistance $R_T$ is 47 kΩ).

$$f_0 = 0.722/(R_T * C_T). \tag{1}$$

The frequency of the oscillating signal typically needs to be less than 20 kHz, because higher frequencies radiate more easily to the outside of the printer. This upper frequency constraint limits the amount of capacitance that sensor 100 can measure. When resistor 235 is 47 kΩ, a toner capacitance of 750 pF causes the output of oscillator 130 to have a frequency of 20.48 kHz. Hence, the toner capacitance cannot be much smaller than 750 pF, because otherwise the oscillating frequency would greatly exceed 20 kHz. Also, resistor 235 cannot be made arbitrarily large to reduce the oscillating frequency, because that would upset the bias currents at the inputs of the 555-timer 200.

To ensure that the toner capacitance stays larger than 750 pF, large-area electrodes or multiple electrodes in parallel pairs are used to form the toner capacitor 105. In addition, the toner-capacitor's electrodes have to be placed within the container that stores the toner material, since the capacitance of a capacitor decreases as the distance between the capacitor's electrodes increases. When the toner-capacitor's electrodes are outside the toner container, the toner capacitance typically is less than 750 pF, and often falls within the sub-pico Farad range as the toner level decreases.

Consequently, the prior art sensor 100 cannot be used when its toner-capacitor electrodes are placed outside of the toner container, because cannot detect small toner capacitances while maintaining proper operational parameters. However, it is often desirable to place the electrodes outside the toner container of the toner cartridge, because placing electrodes inside cassettes adds cost to the consumable element rather than the more expensive printer engine.

Another disadvantage of the sensor 100 is that the toner-capacitor's first electrode 115 is driven by the voltage source 125 through a high-impedance path (i.e., through high-impedance resistor 235). This high-impedance path makes the input voltage to the timer 200 susceptible to shunting capacitances. Thus, the wires and electrical elements connecting the toner-capacitor 105 and the voltage source 125 must be far enough away from neighboring conductive objects to avoid shunting capacitances and thereby allow accurate and repeatable measurements. This further reduces the possible positions of the toner-capacitor electrodes relative to other conducting parts of the printer and the toner cassette.

FIG. 3 presents another prior art sensor, which is similar to the sensors disclosed in U.S. Pat. Nos. 5,465,619 and 5,987,269. Sensor 300 uses the toner-capacitor to generate a signal, and then analyzes the amplitude of this signal to derive the toner capacitance $C_T$ and thereby the toner level. As shown in FIG. 3, sensor 300 includes (1) a toner-capacitor 305, (2) a power source 325, (3) an amplifier 330, (4) a rectifier 335, and (5) a comparator 340.

The toner-capacitor is formed by placing two electrodes 310 and 315 outside the toner container 320. The A.C. power source 325 drives the first electrode 310 of the toner-capacitor. This driving induces current flow between the amplifier 330 and the second electrode 315 of the toner-capacitor 305. The magnitude of this induced current depends on the capacitance $C_T$ of the toner-capacitor, and thereby on the amount of toner in the container 320.

The amplifier 330 amplifies the induced current and generates an A.C. voltage signal. The amplifier also maintains the second electrode 315 at virtual ground. The rectifier 335 then,converts the amplified A.C. voltage signal into a D.C. voltage. The comparator 340 compares the generated D.C. voltage with a reference voltage $V_{REF}$, and this comparison indicates whether the toner level is less than a predetermined amount.

The sensor 300 can measure sub-pico Farad capacitances without the high frequency limitations of sensor 100. Thus, it can be used to measure the capacitance that results from placing the capacitor electrodes outside of the toner container. However, for two reasons, the sensor 300 has poor response in electrically noisy environments.

First, the toner-capacitor is susceptible to shunting capacitances because its first electrode 310 is driven by the high-impedance output of the power supply. The high impedance path to the toner-capacitor causes the current, which is intended for the toner capacitor, to divert to neighboring conductive objects. Hence, sensor 300 needs the wires and electrical elements connecting the first electrode 310 and the power source 325 to be isolated from neighboring conductive objects, in order to avoid shunting capacitances and thereby allow accurate measurements.

Second, the second electrode 315 is susceptible to direct induced currents from nearby fluctuating voltage potentials. Such fluctuating potentials can be due to (1) moving, conducting objects near the second electrode, or (2) stationary nearby objects that have fluctuating potentials. Hence, the second electrode 315 and connecting wires have to be far enough away from fluctuating voltage potentials, in order to allow the sensor to take accurate measurements. Sensor 300 is thus not able to measure small changes in capacitance within these printers without costly low-pass and band-pass filters, and other stabilizing features.

The noise sensitivity of the toner-capacitor electrodes 310 and 315 limits their positions to electrically quiet locations inside the printer. For example, sensor 300 cannot be placed near a conducting or rotating stir rod inside a toner cassette. However, it is often desirable to position at least one electrode inside the toner cartridge near the moving parts of the cartridge, because such positions typically provide the most sensitive toner level measurements.

In view of the foregoing, one of ordinary skill will understand that there is still a need in the art for a capacitive sensor that measures sub-pico Farad capacitances. Ideally, this sensor should be insensitive to unwanted shunting capacitances and should be able to operate in electrically noisy environments. There is also a need for a capacitance sensing circuit that is less expensive and requires looser tolerances on part specifications. There is a further need for a toner sensor that does not increase the cost or complexity of the toner cartridges.

SUMMARY OF THE INVENTION

One embodiment of the invention is a capacitive sensor for sensing the amount of material in a container. This embodiment includes an oscillator that generates an oscillating signal. This oscillator includes an integrating amplifier that is formed by (1) an operational amplifier that has a low-impedance output and a virtually-grounded input, and (2) a capacitor that has a capacitance which depends on the amount of material in the container. The capacitor connects between the low impedance output and the virtually-grounded input of the operational amplifier. In some embodiments, the operational amplifier includes a first amplifier and a second amplifier that are connected in series, with an output of the second amplifier fed back through the capacitor to the input of the first amplifier.

Another embodiment of the invention is a capacitive toner-level sensor that senses the amount of toner material in a toner cartridge of a reprographic device. This embodiment also includes an oscillator that generates an oscillating signal. The oscillator includes a toner-capacitor, a capacitance multiplier, and a resistance multiplier. The toner-capacitor has a capacitance that depends on the toner level in the container. The toner-capacitor also has a first electrode and a second electrode. The capacitance multiplier couples to the second electrode in order to drive this electrode to a negative voltage, while the resistance multiplier couples to the first electrode in order to reduce the current flow to and from the first electrode.

In some embodiments of the invention, one of the electrodes of the toner capacitor is a conductive component part of a toner cartridge, while the other electrode is positioned outside of the toner cartridge. In some of these embodiments, the conductive component part is a developer roller.

BRIEF DESCRIPTION OF THE DRAWINGS

The objects, features, and advantages of the present invention will be apparent to one skilled in the art, in view of the following detailed description in which.

DETAILED DESCRIPTION OF THE INVENTION

The invention is directed toward a capacitive sensor for sensing the amount of material in a container. In the following description, for purposes of explanation, specific nomenclature is set forth to provide a thorough understanding of the present invention. However, it will be apparent to one skilled in the art that these specific details are not required in order to practice the present invention.

The detailed description is presented in three sections. Sections I and II present two embodiments of the invention's capacitive sensors. Section III presents several manners for positioning capacitor electrodes in and about a toner cartridge.

I. One Embodiment of the Invention's Capacitive Sensor

One embodiment of the invention is a capacitive sensor that detects the amount of toner in a toner cartridge of a reprographic device, such as a printer or copier. This capacitive sensor detects the toner level by (1) using the toner-capacitor to generate an oscillating signal, and then (2) analyzing the frequency of the oscillating signal to quantify the toner capacitance.

Figure 4:
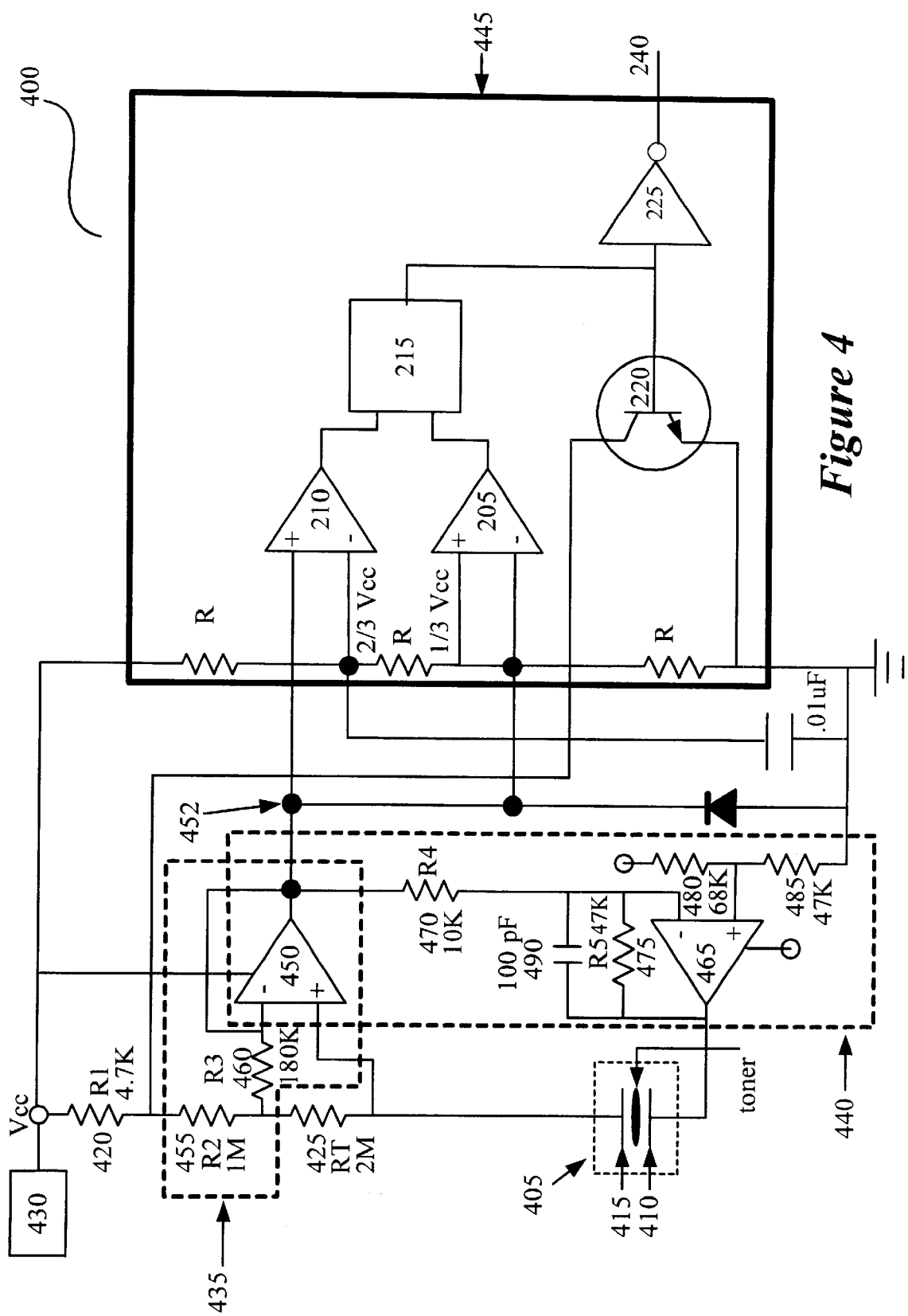
FIG. 4 illustrates one embodiment of the invention's capacitive sensor.

FIG. 4 illustrates an oscillator 400 that is used in this embodiment of the invention. The oscillator 400 generates an oscillating signal at its output terminal 240. The frequency of this signal is determined by the capacitance ($C_T$) of the toner-capacitor 405.

Figure 1:
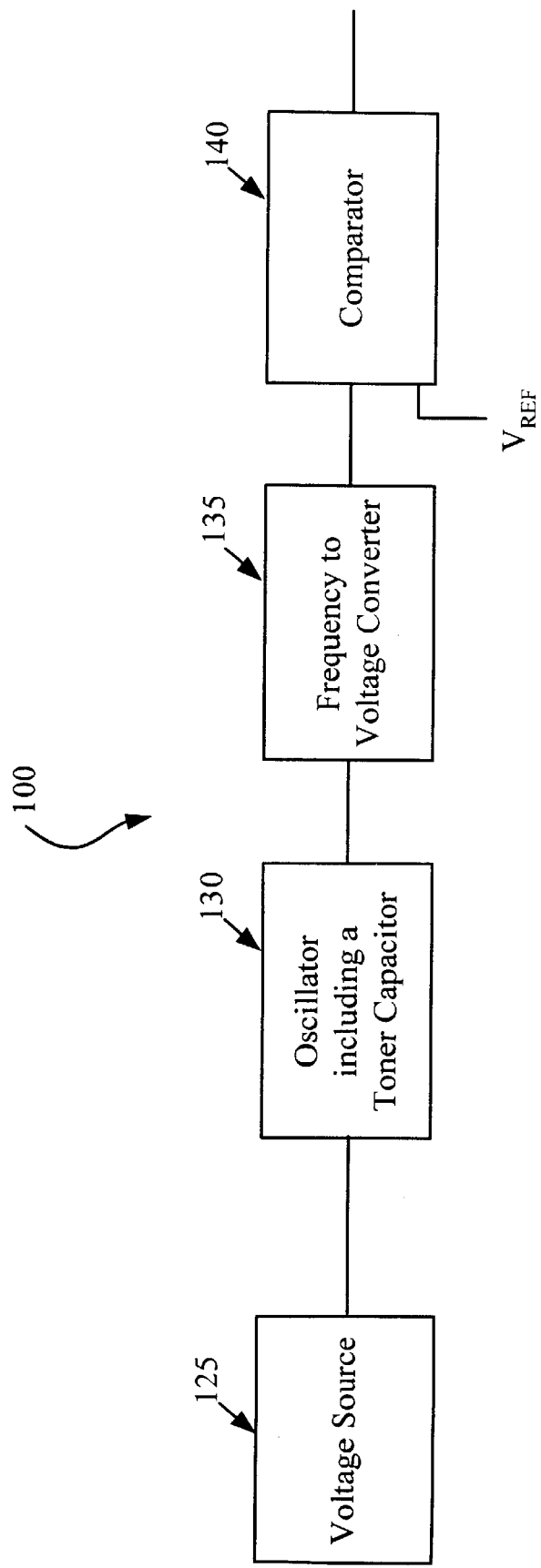
FIG. 1 illustrates a prior art capacitive sensor.

In some embodiments of the invention, this oscillating output signal is supplied to a frequency-to-voltage converter (such as frequency-to-voltage converter 135 of FIG. 1). This converter produces an output voltage signal indicative of the frequency of the oscillating signal. A comparator (such as comparator 140 of FIG. 1) may be used to compare this output voltage with a reference voltage, and based on this comparison, indicates whether the capacitance of the toner-capacitor has decreased below a referenced level. Such a decrease would indicate that the toner level has decreased below a threshold level. The frequency of the oscillator output signal at terminal 240 may be converted to a measure of toner level. This information may then be communicated to the user of the reprographic device.

As shown in FIG. 4, the oscillator includes (1) a toner-capacitor 405, (2) a resistance multiplier 435, (3) a capacitance multiplier 440, (4) a 555-timer 445, and (5) resistor ($R_T$) 425 and resistor (R1) 420. The resistance multiplier 435 is formed by amplifier 450, resistor (R2) 455, and resistor (R3) 460, while the capacitance multiplier 440 is formed by amplifiers 450 and 465, resistor (R4) 470, resistor (R5) 475, biasing resistors 480 and 485, and capacitor 490.

The toner-capacitor 405 is formed by placing two electrodes 410 and 415 near the toner material. The second electrode 410 connects to the capacitance multiplier 440, while the first electrode 415 connects to a constant voltage source 430 through resistors 420, 425, and 455. The first electrode also connects to the input node 452 of the 555-timer 445 through amplifier 450.

Figure 2:
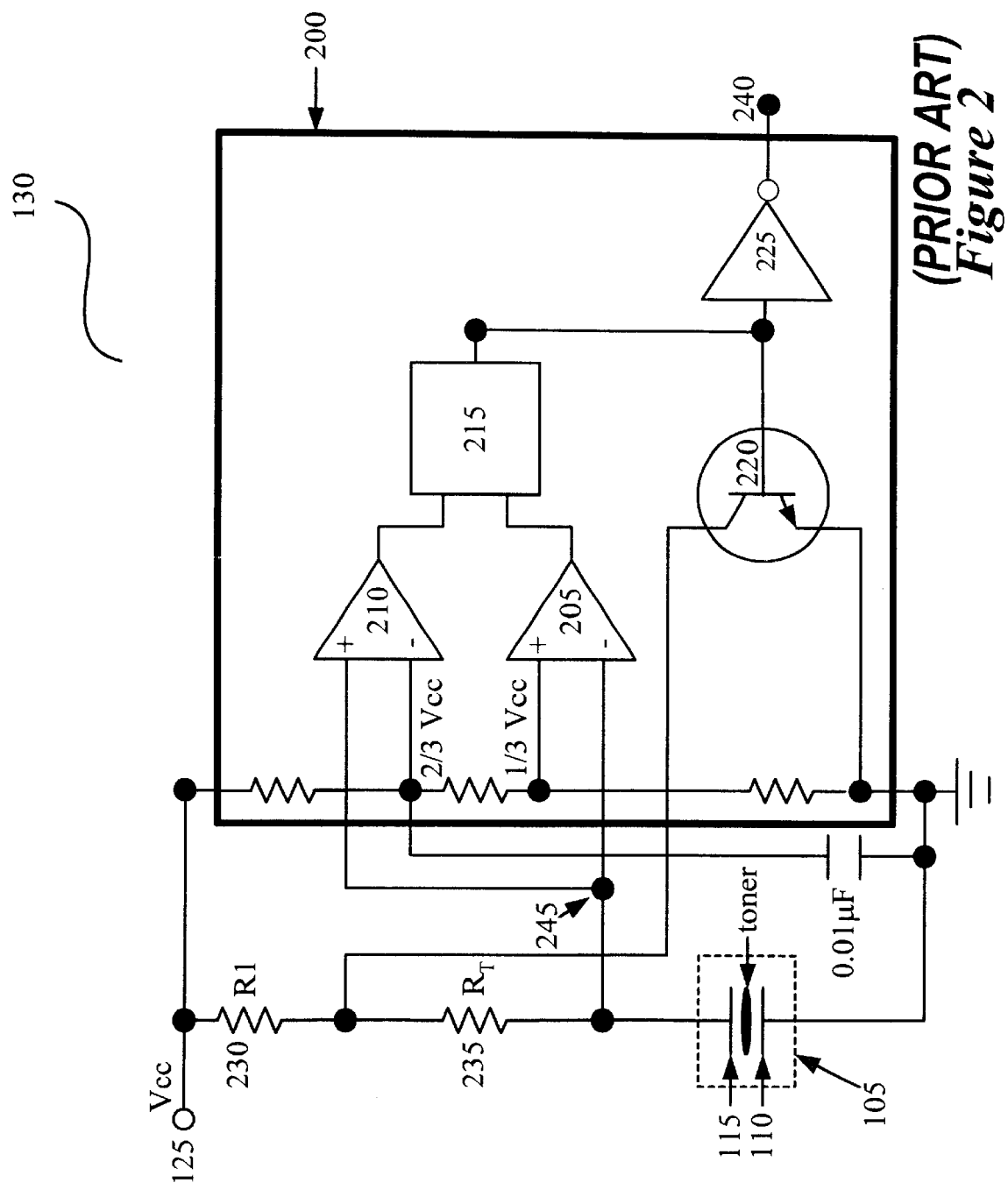
FIG. 2 illustrates a more detailed view of an oscillator of the sensor of FIG. 1.
Figure 3:
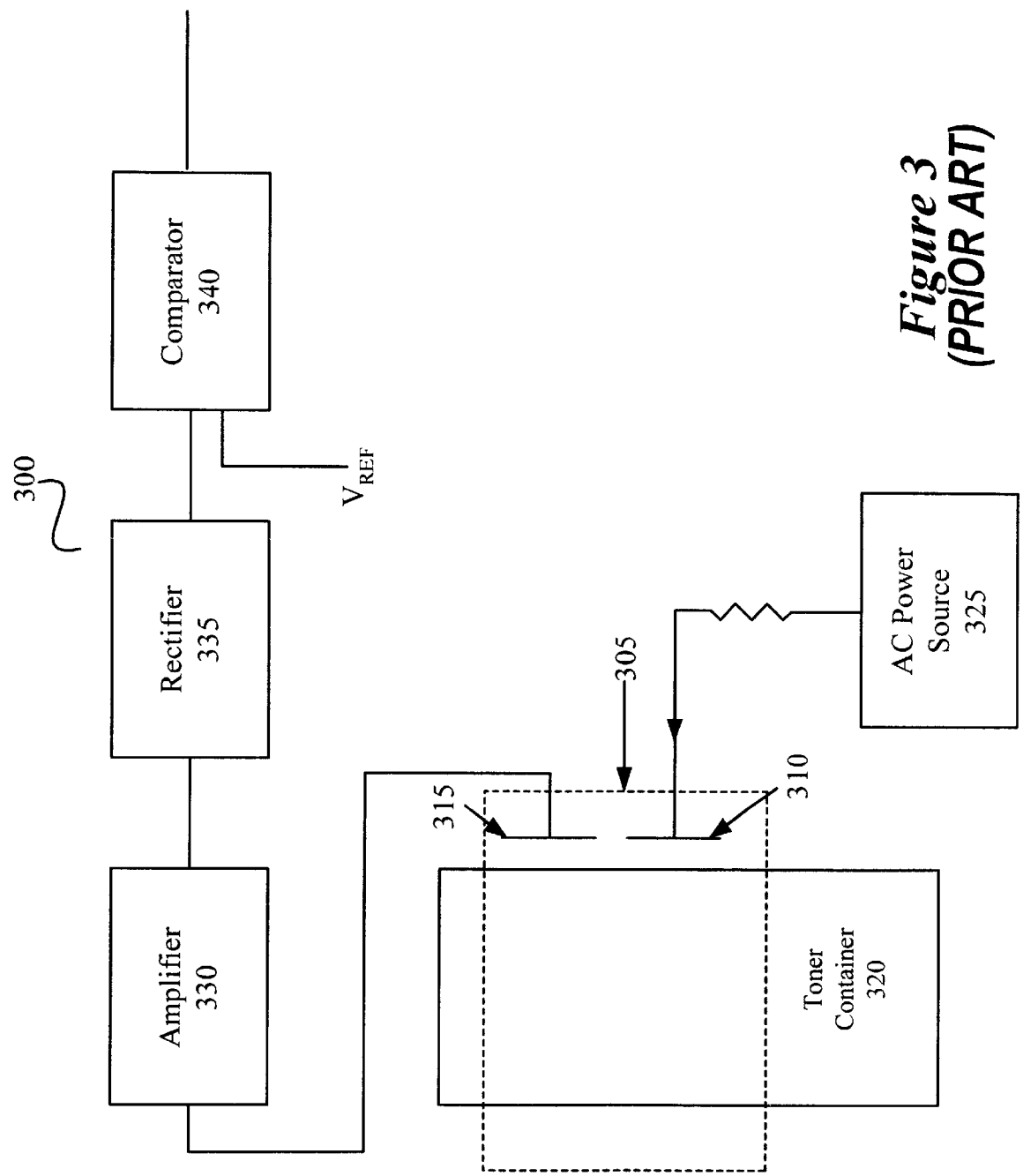
FIG. 3 illustrates another prior art capacitive sensor.

Like the 555-timer 200 of FIG. 2, the 555-timer 445 includes a lower comparator 205, an upper comparator 210, a flip-flop 215, a discharge transistor 220, and an inverting output driver 225. The lower and upper comparators 205 and 210 electrically connect to the input node 452 to receive the output of the amplifier 450. As shown, the amplifier 450 is configured as a unity gain buffer. Hence, the output of this amplifier equals the potential on the toner-capacitor's first electrode 415. Thus, the upper and lower comparators receive the potential on the first electrode 415 through this amplifier.

When current flows towards the toner-capacitor through resistor 420, the resistance multiplier 435 draws some of this current through resistor 460. This multiplier drains the current through resistor 460 into the output stage of the operational amplifier 450. Similarly, when current flows away from the toner-capacitor through resistor 425, this multiplier supplies current through resistor 460 that adds to the current through resistor 425. In both cases, the resistance multiplier reduces current flow to and from the first electrode 415, by a factor equal to [(1+R2/R3)+R2/RT]. This current reduction proportionally slows down the charging and discharging of the toner-capacitor, and thereby reduces the oscillation frequency $f_0$.

As mentioned above, the toner-capacitor's second electrode 410 connects to the capacitance multiplier 440. The capacitance multiplier's amplifier 465, resistors 470, 475, 480, and 485, and capacitor 490 form an inverting amplifier, with a negative gain of R5/R4. This inverting amplifier receives approximately the positive potential on the capacitor's first electrode 415, through the buffer amplifier 450. This received potential is approximately between ⅓Vcc and ⅔Vcc during the steady-state operation of the oscillator 400.

Based on this potential at the negative input of amplifier 465, the inverting amplifier then outputs a negative voltage that sets the voltage on the second electrode 410 to a negative value. This negative voltage on the second electrode 410 requires a greater charge build up on the first electrode 415, before the potential on this latter electrode reaches the input threshold (i.e., $\frac{2}{3}V_{CC}$) of the comparator 210. The negative voltage on the second electrode 410 similarly increases the charge drain required to reach the input threshold of lower comparator 205 (i.e., ⅓Vcc) during the toner-capacitor discharge. Hence, the capacitance multiplier makes the capacitance of toner capacitor 405 seem larger by pulling down the potential on the second electrode 410. This capacitance $C_T$ seems larger by a factor of R5/R4. Capacitor 490 reduces the gain of amplifier 465 for high frequencies, which thereby reduces the capacitance multiplying effect of high frequency noise.

The operation of the oscillator 400 is as follows. Initially, the discharge transistor 220 of the 555-timer 445 is off. This allows the first electrode 415 of the toner-capacitor 405 to charge towards $V_{cc}$ through the resistors 420, 425, and 455. When the voltage of the first electrode 415 reaches $\frac{2}{3}V_{CC}$, the upper comparator 210 sets the flip-flop 215 to output a high value. This high value turns on the discharge transistor 220 and causes the inverting output driver 225 to output a low value. The discharge transistor 220, in turn, discharges the toner-capacitor 405 until the voltage on the first electrode 415 reaches $\frac{1}{3}V_{CC}$. At this time, the lower comparator 205 resets the flip-flop 215 to output a low value. This low value turns off the discharge transistor 220 and causes the inverting output driver 225 to output a high value. This oscillating process continues indefinitely, and results in an oscillating signal at the oscillator output 240.

The frequency of the oscillating output signal depends on how quickly the voltage on the first electrode 415 of toner-capacitor 405 charges to $\frac{2}{3}V_{CC}$ and discharges to $\frac{1}{3}V_{CC}$. As described above, the resistance multiplier slows down the charging and discharging of capacitor 405, by reducing the current flow to and from the first electrode. The capacitance multiplier also slows down the charging and discharging of capacitor 405, by requiring more current to flow to and from the first electrode in order to reach the threshold voltages. Equation (2) represents the frequency of the oscillating signal produced by the oscillator 400, when the resistance R1 is much smaller than the resistance $R_T$ (e.g., resistance R1 is 4.7 KΩ while resistance $R_T$ is 2MΩ).

$$f_0 = 0.722/\{(R_T(1+R2/R3)+R2)*C_T*R5/R4)\}. \quad (2)$$

Oscillator 400 can be used in a sensing circuit to measure sub-pico Farad toner capacitances. For example, the oscillating signal's frequency is only 19.5 kHz when the toner capacitance reaches 0.6 pF, with the component values shown in FIG. 4. In other words, this oscillator generates an oscillating signal that is within the operational parameters even when the toner capacitance is in the sub-pico Farad range. Hence, this oscillator allows the toner-capacitor electrodes to be placed outside of the toner container. This oscillator 400 also is inexpensive as its components are relatively inexpensive.

II. Another Embodiment of the Invention's Capacitive Sensor

Figure 5:
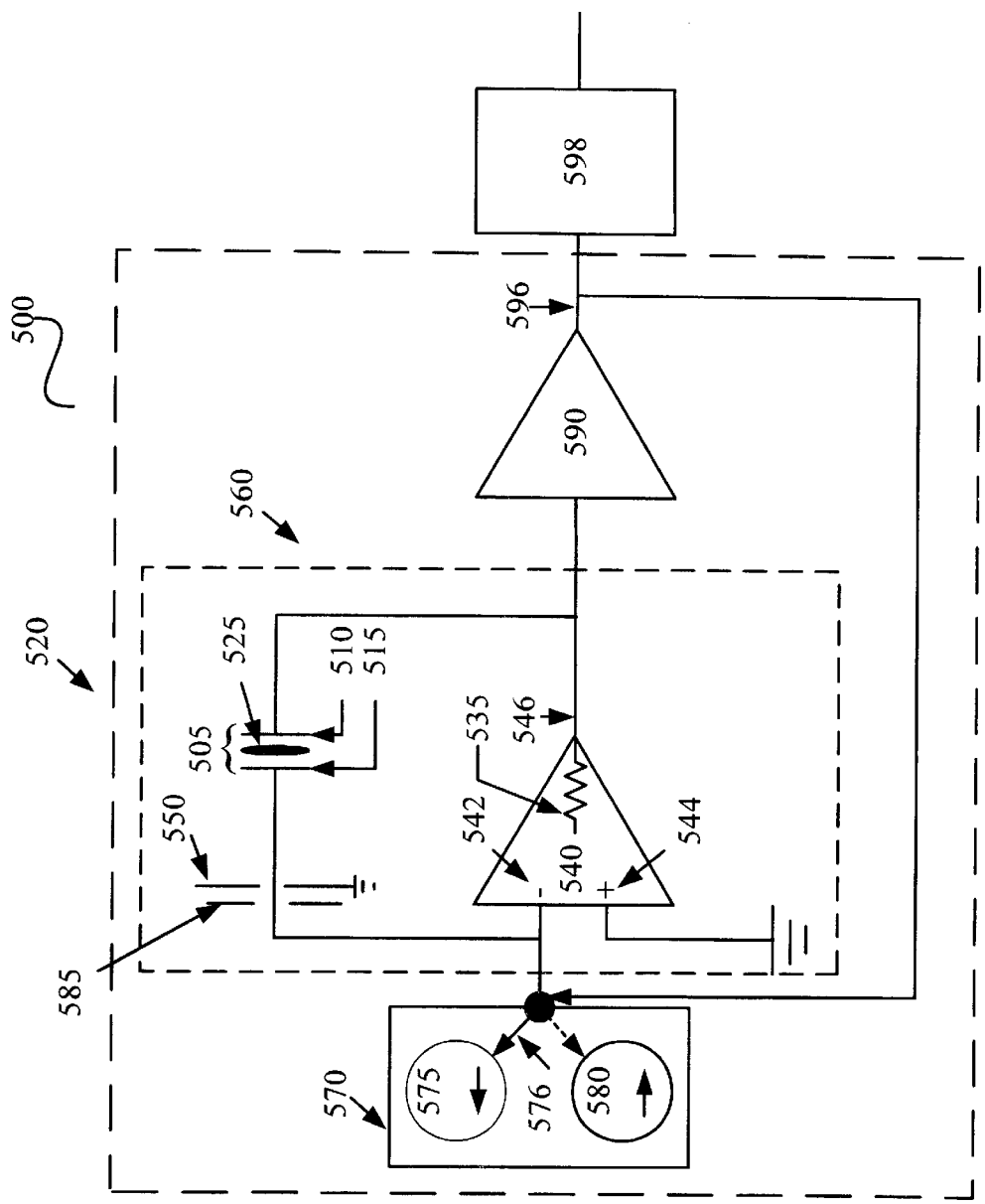
FIG. 5 illustrates another embodiment of the invention's capacitive sensor.

FIG. 5 illustrates another embodiment of the invention's capacitive sensor. As shown in this figure, the sensor 500 uses the toner-capacitor to generate an oscillating signal. It then analyzes the frequency of the oscillating signal to sense the toner capacitance and thereby the toner level. This sensor includes an oscillator 520 and a frequency analyzing circuit 598. The oscillator 520 includes (1) a switchable, constant current source 570, (2) an integrating amplifier 560, and (3) a Schmidt trigger 590.

A toner-capacitor 505 and an operational amplifier 540 form the integrating amplifier 560. The toner-capacitor 505 is formed by placing two electrodes near the toner material 525. The capacitor's first electrode 510 connects to the amplifier's low-impedance, output terminal 546, while its second electrode 515 connects to the amplifier's virtually grounded, negative input terminal 542. The input 542 is virtually grounded since the amplifier 540 via feedback capacitor 505 holds this input at the same potential as that of the input 544, which is directly tied to ground potential.

The amplifier's negative input 542 connects to the current source 570. The current source 570 includes (1) two internal current sources 575 and 580 that provide equal but opposite currents, and (2) a switch 576 that selects one of the two current sources based on the output signal 596 of Schmidt trigger 590. The switch 576 couples the negative input 542 to (1) the positive current source 580 when the Schmidt trigger's output is high, and (2) the negative current source 575 when the Schmidt trigger's output is low.

The Schmidt trigger 590 connects to the output 546 of the amplifier 540. Based on this output voltage, the Schmidt trigger outputs a square wave. Specifically, the Schmidt trigger outputs a high value when its input value reaches a low threshold value, and outputs a low value when its input value reaches a high threshold value.

The Schmidt trigger's output signal is not only fed back to the switch 576 of the current source, but it is also supplied to the frequency analyzing circuit 598. This circuit analyzes the frequency of the oscillating output signal to determine the toner capacitance and thereby the toner level. In some embodiments of the invention, the frequency-analyzing circuit 598 includes a frequency-to-voltage converter and a comparator, similar to those illustrated in FIG. 1.

Operation of the sensing circuit 500 is as follows. Initially, the switch 576 couples the positive current source 580 to the negative input 542. This causes a positive current to be supplied to the second electrode 515. Operational amplifier 540 responds to this current by feeding back a current, from its output 546, to the first electrode 510 of the capacitor 505. This feedback current is equal and opposite to that supplied to the second electrode 515. This feedback current induces a current from the first electrode 510 that opposes and thereby negates the current that is supplied to the second electrode 515. Thus, there is no net voltage rise or fall at the second electrode 515. This action is a consequence of the amplifier 540 outputting a potential to drive the input 542 to be the same as that of input 544, which is grounded.

Meanwhile, the capacitance $C_T$ of toner-capacitor 505 causes the amplifier output current (I) to integrate to a charge (Q) on the first electrode 510. This charge buildup causes the voltage (V) at the first electrode 510 to increase linearly at a rate defined by Equation (3) below.

$$\Delta V = \Delta Q/C_T = I*t/C_T. \quad (3)$$

In this equation, t is the amount of time current flows.

The voltage at the first electrode 510 and at the input to Schmidt trigger 590 increases until it reaches the upper input threshold of the Schmidt trigger. Before the voltage reaches the upper threshold value, the Schmidt trigger outputs a high value. However, after the upper input threshold is reached, the Schmidt trigger outputs a low value, which causes switch 576 to couple the negative current source 575 to the negative input 542 of amplifier 540.

The voltage on the capacitor's first electrode 510 then decreases, until the lower input threshold of the Schmidt trigger 590 is crossed. Thus, a cycling triangular wave is generated at the output 546 of the integrating amplifier 560 and a cycling square wave is generated at the output 596 of the oscillator 520. The capacitance of the toner capacitor 505 determines the frequency of the triangular-wave oscillator's output, which, in turn, sets the frequency of the output of the oscillator 520.

The sensor 500 minimizes current leakage due to shunting capacitances. This is because the first electrode 510 receives current from amplifier 540 through a low impedance (~100 Ohm) output resistor 535. Hence, the charge buildup at the first electrode is not significantly affected by shunting capacitances.

In addition, the second electrode 515 is protected from shunting capacitances since it is kept at a virtual ground. In this manner, no net current flows to or from the second electrode from nearby conductive objects that are at fixed potentials. If the second electrode had an A.C. potential, current would flow to and from the second electrode to the neighboring parasitic capacitances. Such current flow would harm the operation of the triangular wave oscillator 560, since its input operates in a current mode. This input is designed as a current summing node that stays at virtual ground, as the amplifier's 540 output pumps current into this node to offset the input current.

The sensor 500 also uses an optional guard 550 situated between the second electrode and the potentially disturbing objects 585, to protect electrode 515 from being disturbed by external fluctuating voltage potentials (e.g., potentials that may result from moving conductors or charged objects). This guard is a conducting element that is separated from the sensing circuit, but is maintained at ground potential (or otherwise the same virtual ground potential) as the second electrode 515.

As described, such a guard may be placed between the second electrode and the source of a fluctuating potential. The guard receives current induced by the fluctuating potentials described above, but maintains a near constant potential at ground or virtual ground. In this manner, the guard 550 hides or shields the fluctuating potential from the second electrode 515. A guard 550 may also be used to protect other virtually grounded circuit elements. A coaxial shielding jacket, for example, is an effective guard 550 for a wire that connects to electrode 515. One may also design a guard against ground currents that inductively couple to electrode leads.

Sensor 500 can detect a large range of toner capacitances. It can measure capacitances below 0.5 pF without generating oscillating frequencies greater than 20 kHz. It is also much less sensitive to electrically noisy environments than prior art sensors. Thus, sensor 500 allows greater freedom to place electrodes in desired locations inside electrically noisy reprographic devices, such as printers or copiers. For instance, an electrode can be placed close to moving metal parts or electrically charged bodies. Hence, an electrode can be placed inside or near a toner cartridge.

The toner-capacitor's electrodes 510 and 515 and connecting wires need to be isolated as much as possible from parasitic capacitances. Operational amplifiers (such as amplifier 540) are one source of parasitic capacitance. For example, a capacitance of roughly 0.5 pF can be measured between the output and the input of many operational amplifiers. This parasitic capacitance can significantly affect the measurement of toner capacitance $C_T$, since it is on the order of, and effectively in parallel with, the toner capacitance that sensor 500 is to measure.

Figure 6:
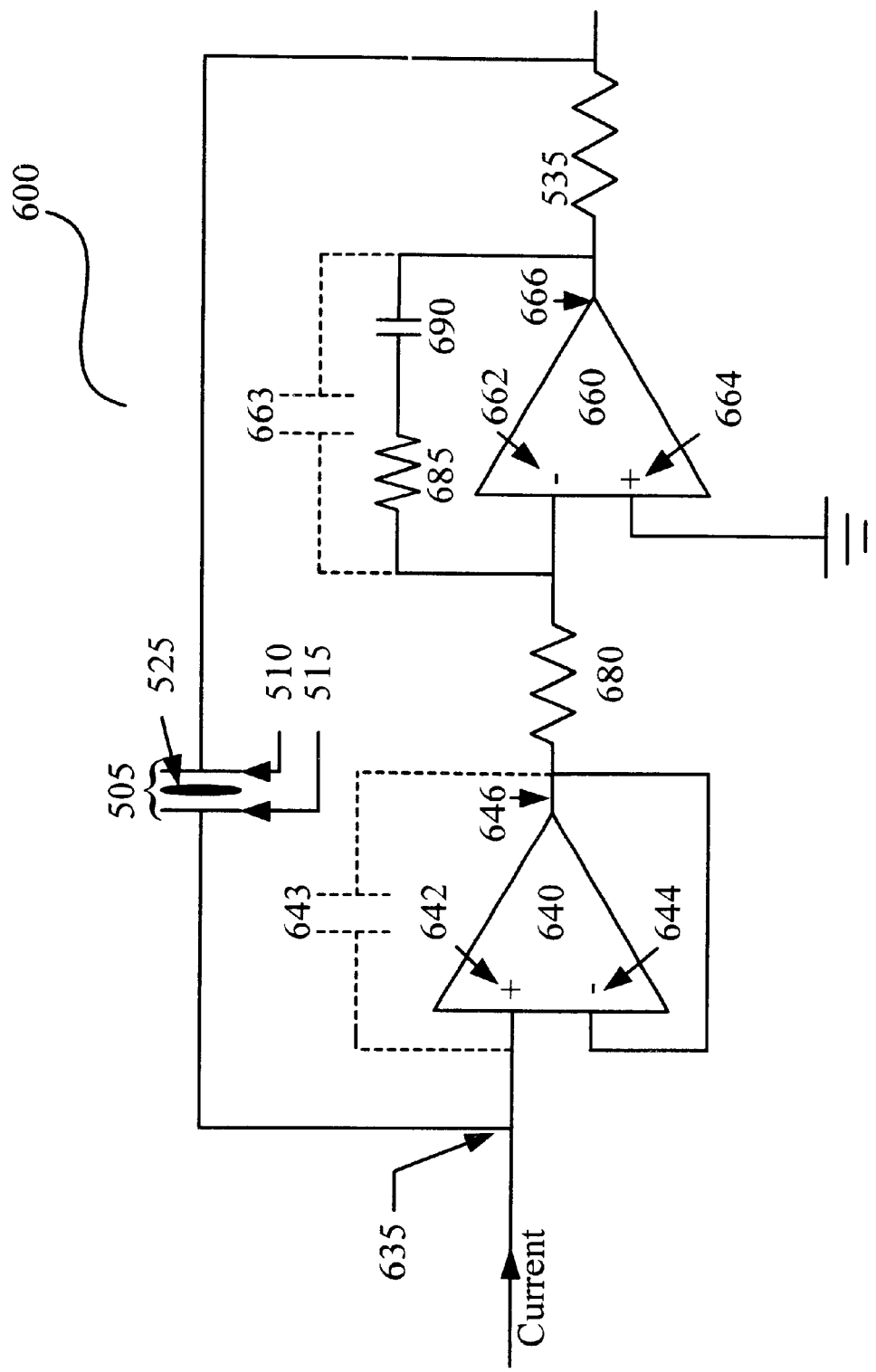
FIG. 6 illustrates one embodiment of an amplifier used in the sensor of FIG. 5.

One way of reducing the parasitic-capacitance effect in FIG. 5 is by using two amplifiers to implement the operational amplifier 540 of the integrating amplifier 560. FIG. 6 illustrates one such implementation. As shown in this figure, the integrating amplifier 600 includes (1) the toner-capacitor 505, (2) a non-inverting amplifier 640, (3) an inverting amplifier 660, (4) resistors 680, 685 and 535, and (5) a capacitor 690.

The toner-capacitor's second electrode 515 connects to the positive input 642 of the non-inverting amplifier 640, while its first electrode connects to the resistor 535, which connects to the output of the amplifier 660. The output 646 of the amplifier 640 feeds back to its negative input 644, forming a unity gain buffer. The output 646 also connects to the negative input terminal 662 of inverting amplifier 660 through the resistor 680. The output 666 of amplifier 660 feeds back to its negative input 662 through the resistor 685 and capacitor 690. The positive input terminal 664 of amplifier 660 is grounded, and this maintains the negative input terminal 662 at a virtual ground.

As discussed above, amplifiers have parasitic capacitances between their inputs and outputs. FIG. 6 pictorially illustrates parasitic capacitances 643 and 663 between the input and output of amplifiers 640 and 660 respectively. Parasitic capacitors 643 and 663 are not actual capacitors designed into the circuit, but are an unavoidable part of amplifiers 640 and 660, and affect the circuit as shown.

The structure of the integrating amplifier 600 minimizes the effect of the parasitic capacitances because the inputs to amplifiers 640 and 660 are both at virtual-ground. As previously described, the negative input 662 to amplifier 660 is at virtual ground since its positive input 664 is grounded. As capacitor 690 is at high impedance at low frequencies, little current flows through resistors 680 and 685, which maintains the voltage at output 646 approximately equal to the voltage at input 662. Hence, the negative input 644 and the output 646 of amplifier 640 are both virtually-grounded because they directly connect to the virtually-grounded input 662 of amplifier 660. Thus, the positive input 642 is also virtually-grounded, and amplifier 640 has a virtual-short across it. Consequently, any parasitic capacitance present across amplifier 640 can accumulate no charge. In other words, the current flowing into the input node 635 flows to the second electrode 515, not through the parasitic capacitor 643.

Figure 7:
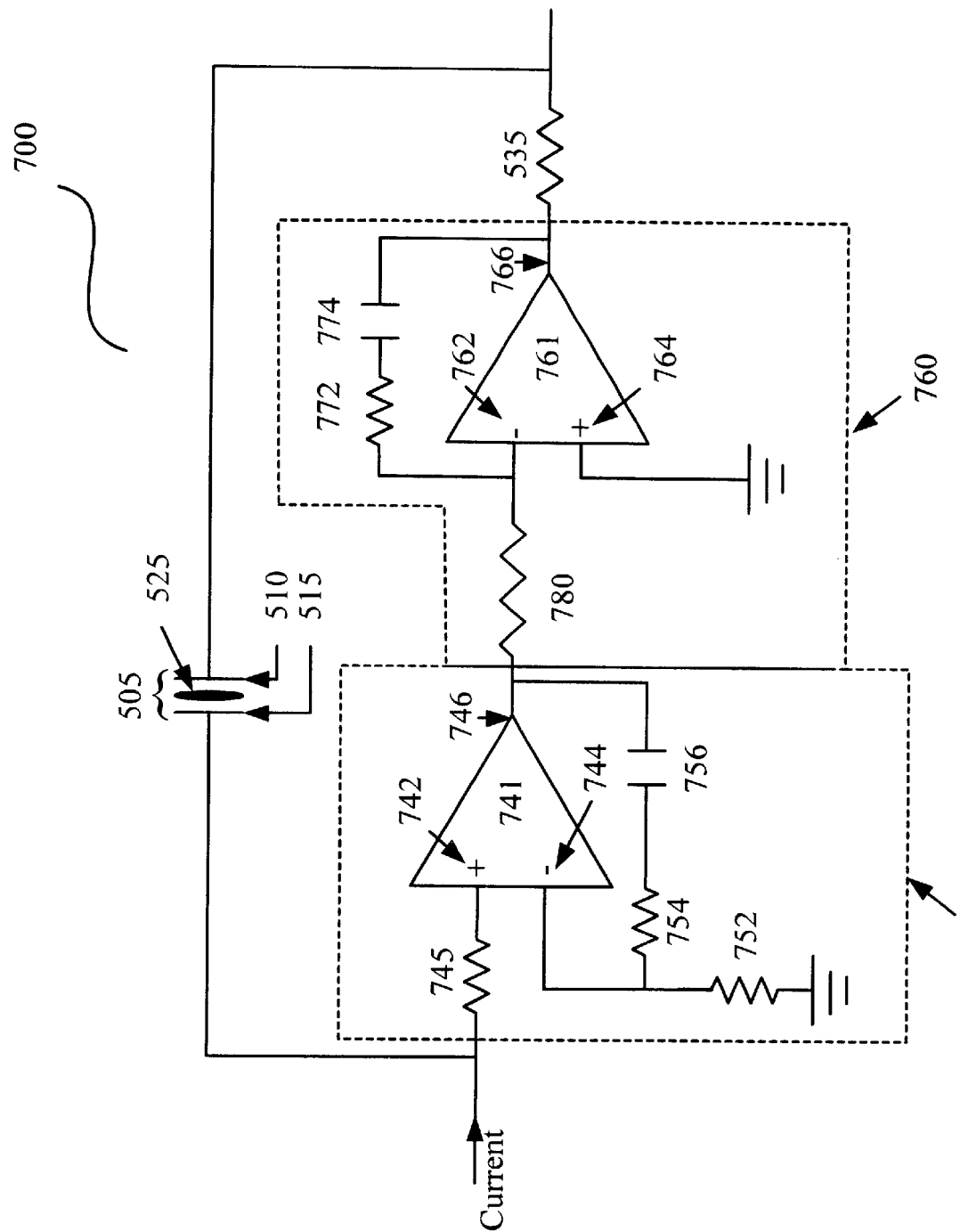
FIG. 7 illustrates another embodiment of the amplifier used in the sensor of FIG. 5.

FIG. 7 presents another embodiment of integrating amplifier 560. Integrating amplifier 700 has more gain than the amplifier 600 of FIG. 6. This allows amplifier 700 to detect smaller toner capacitances than amplifier 600. Integrating amplifier 700 includes (1) the toner-capacitor 505, (2) a first amplifier stage 740, (3) a second amplifier stage 760, and (4) output resistors 780 and 535.

The first amplifier stage 740 includes the amplifier 741, resistors 745, 752 and 754, and capacitor 756. The first amplifier's output feeds back through resistor 754 and capacitor 756 to the amplifier's negative input 744. The first stage amplifier is thus configured as a non-inverting amplifier with gain.

The first amplifier's output drives the second amplifier stage 760 through resistor 780. The second amplifier stage 760 includes the amplifier 761, resistor 772, and capacitor 774. The negative input 762 of the amplifier 761 receives the output of the amplifier 741 through the resistor 780. This negative input 762 also couples to the output 766 of the amplifier 761 through the feed-back resistor 772 and capacitor 774. The positive input 764 of the amplifier 761 is grounded. Hence, in this configuration, the negative input terminal 762 is maintained at virtual-ground, and the second amplifier stage 760 is an inverting amplifier with gain.

The output 766 of the second amplifier stage 760 connects to the toner capacitor's first electrode 510 through the output resistor 535. The toner capacitor's second electrode 515 connects to the positive input 742 of the non-inverting amplifier 740 through input resistor 745, which serves as a current limiter.

The output of the second amplifier stage 760 has a larger swing than the output of the first stage amplifier 740. This means that the potential difference across the first amplifier is significantly less than the potential difference across the toner capacitor. Hence, most of the input current is routed to the toner capacitor 505. In other words, the larger output swing of the second amplifier stage prevents the parasitic capacitance between the output and input of amplifier 741 from significantly affecting the current to and from the second electrode 515.

In addition, components 752, 754, 756, 780, 772, and 774 provide loop compensation that eliminates spurious oscillations dues to amplifier phase delays. When two amplifiers are arranged in series, a phase delay of greater than 180° with a gain greater than unity often occurs above a particular frequency. Oscillation can then occur when the output of the second stage amplifier is fed-back to the input of the first stage amplifier.

The component values for resistors 752, 754, 756, 780, 772, and 774 set the high frequency gain of the integrating amplifier 700. These values are selected to ensure that the gain of the integrating amplifier 700 is below unity at frequencies where the phase angle has gone beyond 180°. In other words, at frequencies where the amplifier 700 might otherwise oscillate, these component values reduce the gain to stabilize the circuit.

The component 752, 754, 756, 780, 772, and 774 form a pole/zero pair around each amplifier. The poles roll-off the gain, but also unfortunately introduce additional phase angle. The zeroes pull back on the gain attenuation at a somewhat higher frequency, and cancel the added phase delay. The end result is an attenuated gain at high frequencies, with no added phase delay. The pole/zero pairs around each amplifier are set at different frequencies (e.g., they are set about 1 MHz for first amplifier stage 740, and about 740 KHz for second amplifier stage 760), in order to minimize pole "overlap," which would produce a large level of phase delay.

III. Electrode Positions In and About the Toner Cartridge

The prior art suggests numerous locations for placing the toner-capacitor electrodes near the toner material. For instance, U.S. Pat. No. 5,465,619 suggests several of these positions. In addition, U.S. Pat. No. 5,987,269 describes several positions outside the toner cassette (e.g., on the walls and ceiling printer cabinet) for placing the toner-capacitor electrodes. These positions extend the range of toner-capacitor sensing to sub-pico Farad values.

The invention's sensors can work with most, if not all, of the electrode positions identified by the prior art. The invention, however, also provides novel positions for placing the electrodes in and about the toner cartridge. These new positions simplify the integration of the sensor into the design of a reprographic device, while providing accurate sensing of the toner levels. For instance, some embodiments of the invention use a component part (such as the developer roller) of the toner cartridge as one of the electrodes of the toner capacitor. Some of these embodiments then place the other toner-capacitor electrode outside of the toner cartridge.

Figure 8:
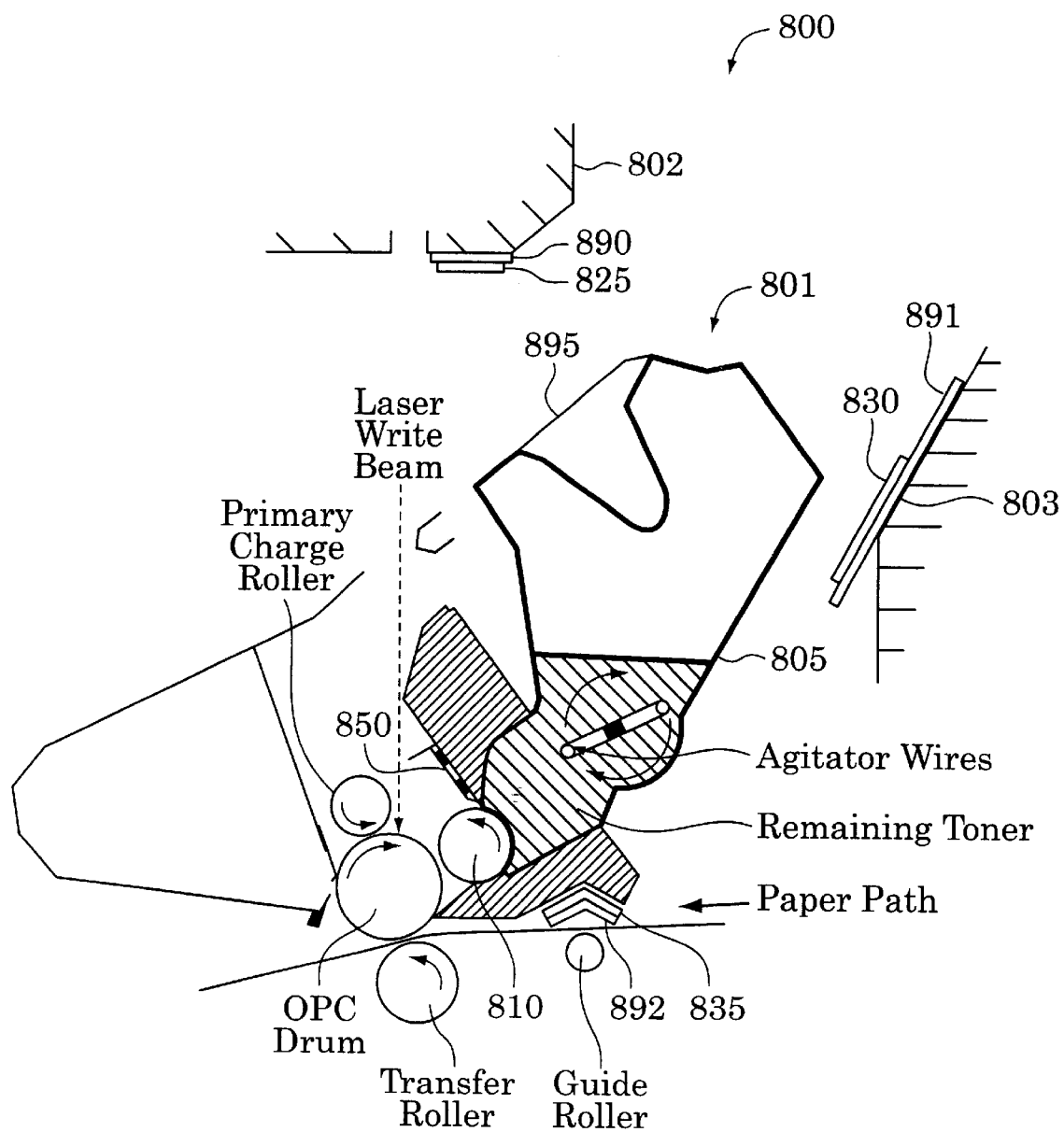
FIG. 8 illustrates a cross-section of a toner cartridge used in some embodiments of the invention.

FIG. 8 illustrates a portion 800 of a reprographic device, such as a printer or copier. This portion includes a toner cartridge 801 that is placed inside a cabinet that has a ceiling portion 802 and a wall portion 803. As shown in this figure, the toner cartridge 801 includes toner container unit 805.

The toner container unit 805 stores the toner material. The walls of the toner container are formed by the plastic shell 895 of the toner cartridge 801 and the outer surface of the developer roller 810 that contacts the toner material. In other words, a portion of the developer roller's outer surface forms part of the interior wall of the toner container that stores the toner material.

Some embodiments of the invention use a conductive component part of the toner cartridge as a first toner-capacitor electrode (such as the first electrode 510 in FIG. 5). As the first electrode, some of these embodiments use the developer roller 810, while other embodiments use other conductive component parts, such as the metal support 850 for the doctor blade.

Some embodiments of the invention then use a variety of locations outside of the toner cartridge to position the second electrode (such as the electrode 515 in FIG. 5). For instance, as shown in FIG. 8, the second electrode can be (1) in position 825, on the cabinet ceiling 802 above the developer roller 810, (2) in position 830, on the cabinet wall 803 across from the developer roller 810, or (3) in position 835, below the developer roller 810. The second electrode can be positioned below the developer roller by attaching it to the outer surface of the toner cartridge, or by attaching it to part of the cabinet.

The second electrode is typically positioned to provide the highest toner-measurement sensitivity (over the full-to-empty range of toner level, or over a selected subset of that range). The position 835 below the developer roller 810 provides the highest sensitivity to toner level as the toner level reaches a near-empty state. On the other hand, the positions 825 and 830 above and across from the developer roller provide high sensitivity toner-level measurements for the entire range of toner levels.

Some embodiments sense the toner level from several places, in order to obtain more accurate measurements. These embodiments utilize multiple secondary electrodes, and hence select multiple positions to place the secondary electrodes. These embodiments determine the toner level by sensing the capacitances of multiple toner capacitors that are formed by the first electrode (e.g., the electrode that is a component part of the toner cartridge) and multiple secondary electrodes.

It is also desirable to place the second electrode in an electrically quiet region of the reprographic device. Also, as illustrated in FIG. 8, guard electrodes 890, 891 and 892 can be used to shield the second electrode in positions 825, 830, and 835 respectively. As discussed above, a guard electrode in some embodiments of the invention shields the second electrode, in order to protect this electrode from fluctuating voltage potentials of nearby conductive objects lying approximately on the other side of the guard electrode, with respect to the guarded electrode.

In other embodiments of the invention, the positions of the first and second electrodes are reversed, and the first electrode is placed outside the toner container and the second electrode is a part of the toner cartridge. In other words, some embodiments use a conductive component part of the toner cartridge as the second electrode (such as electrode 515 in FIG. 5), and then position the first electrode (such as electrode 510 in FIG. 5) outside the toner cartridge. When one toner-capacitor electrode is unavoidably near a grounded conductor, it is often best to hold that electrode at virtual ground.

The invention's novel positions for placing electrodes in and about the toner cartridge has several advantages. For instance, the invention's electrode configurations are minimally intrusive and easy to integrate into the design of the reprographic device. All that needs to be done is to select a position to place an electrode in the cabinet of the reprographic device. The developer roller, or another conductive component part of the toner cartridge, can then be used to implement the other electrode.

It is beneficial to use the developer roller as one of the electrodes, since the developer roller is already connected to pre-existing wires in the printer via contacts for charging this roller. This provides easy access to the developer roller, by the interfacing circuitry to the capacitance sensor. Also, the developer roller is very close to the toner that remains as the toner is depleted. Hence, the use of the developer roller 810 as one electrode greatly improves sensitivity to toner-level changes in the near-empty state, which often is the greater concern of users.

While the invention has been described with reference to numerous specific details, one of ordinary skill in the art will recognize that the invention can be embodied in other specific forms without departing from the spirit of the invention. For instance, the sensor 500 has been described to detect changes in the amount of toner in a toner cartridge. One of ordinary skill, however, will understand that this sensor 500 can be used to detect the amount of other material in other containers. This sensor can also detect shift in position of material relative to the capacitor electrodes. Thus, one of ordinary skill in the art would understand that the invention is not to be limited by the foregoing illustrative details, but rather is to be defined by the appended claims.

We claim:

1. A capacitive sensor for sensing an amount of a material in a container, said sensor comprising:

an oscillator generating an oscillating signal, said oscillator having an operational amplifier and a capacitor, the operational amplifier having a low-impedance output and a virtually-grounded input, and the capacitor connected between the low impedance output and the virtually-grounded input, wherein the capacitor has a capacitance that depends on the amount of material in the container, and wherein the frequency of the generated oscillating signal depends on the capacitance of the capacitor.

2. The capacitive sensor of claim 1, wherein the operational amplifier includes a first amplifier and a second amplifier that are connected in series, wherein an output of the second amplifier is fedback through said capacitor to an input of the first amplifier.

3. The capacitive sensor of claim 2, wherein said first and second amplifiers have compensations that prevent spurious oscillations at the output of the second amplifier.

4. The capacitive sensor of claim 2 further comprising a frequency analyzing circuit that couples to the oscillator to receive the oscillating output of the oscillator, and generates a signal when the frequency of the oscillating signal crosses a threshold level.

5. The capacitive sensor of claim 4 wherein the frequency analyzing circuit couples to the oscillator through a Schmidt trigger.

* * * * *